US012621770B2

(12) United States Patent
    Li

(10) Patent No.: US 12,621,770 B2
(45) Date of Patent: May 5, 2026

(54) DISCONTINUOUS RECEPTION (DRX) PROCESSING METHOD AND DEVICE, AND COMPUTER STORAGE MEDIUM

(71) Applicant: Beijing Xiaomi Mobile Software Co., Ltd., Beijing (CN)

(72) Inventor: Yanhua Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 833 days.

(21) Appl. No.: 17/757,061

(22) PCT Filed: Dec. 9, 2019

(86) PCT No.: PCT/CN2019/124115
    § 371 (c)(1),
    (2) Date: Jun. 8, 2022

(87) PCT Pub. No.: WO2021/114050
    PCT Pub. Date: Jun. 17, 2021

(65) Prior Publication Data
    US 2023/0018840 A1      Jan. 19, 2023

(51) Int. Cl.
    *H04W 4/00*      (2018.01)
    *H04W 52/02*     (2009.01)
    *H04W 76/28*     (2018.01)
(52) U.S. Cl.
    CPC ... *H04W 52/0235* (2013.01); *H04W 52/0219* (2013.01); *H04W 76/28* (2018.02)

(58) Field of Classification Search
    CPC ......... H04W 52/0235; H04W 52/0219; H04W 76/28; Y02D 30/70
    See application file for complete search history.

(56) References Cited

U.S. PATENT DOCUMENTS

| | | | |
|---|---|---|---|
| 2010/0208660 A1 | 8/2010 | Ji | |
| 2018/0234919 A1* | 8/2018 | Tsuda | ................... H04W 88/04 |
| 2018/0332655 A1 | 11/2018 | Ang et al. | |
| 2018/0338332 A1 | 11/2018 | Lee et al. | |

FOREIGN PATENT DOCUMENTS

| | | |
|---|---|---|
| CN | 103841594 A | 6/2014 |
| CN | 108377551 A | 8/2018 |
| CN | 108616969 A | 10/2018 |

(Continued)

OTHER PUBLICATIONS

"3GPP TS 36.300 V10.0.0," 3rd Generation Partnership Project; Technical Specification Group Radio Access Network; Evolved Universal Terrestrial Radio Access (E-UTRA) and Evolved Universal Terrestrial Radio Access Network (E-UTRAN; Overall description; Stage 2, Release 10, Jun. 2010, 183 pages.

(Continued)

*Primary Examiner* — Omoniyi Obayanju
(74) *Attorney, Agent, or Firm* — McCoy Russell LLP

(57) ABSTRACT

A method for processing discontinuous reception (DRX) is provided. The method includes: sending an indication notification, the indication notification being at least configured to indicate that a DRX parameter or a power saving signal being not applied to at least one first DRX group among two or more DRX groups of user equipment (UE).

16 Claims, 4 Drawing Sheets

(56) References Cited

FOREIGN PATENT DOCUMENTS

| CN | 110536382 A | 12/2019 |
| CN | 110546999 A | 12/2019 |

OTHER PUBLICATIONS

"Further considerations for the WUS," Proceedings of the 3GPP RAN WG2 Meeting #107bis, InterDigital, R2-1913606, Oct. 14, 2019, Chongqing, China, 2 pages.

"Email report [107bis#49][NR TEI16] cDRX enhancement for CA," Proceedings of the 3GPP TSG-RAN2 Meeting #108, Ericsson, R2-1915292, Nov. 18, 2019, Reno, Nevada, 20 pages.

"Further Considerations on multiple C-DRX," Proceedings of the 3GPP TSG-RAN WG2 Meeting #108, Samsung, R2-1916152, Nov. 18, 2019, 3 pages.

"General aspects on cDRX enahncement," Proceedings of the 3GPP TSG-RAN WG2 #108, NEC, R2-1916187, Nov. 18, 2019, 2 pages.

"3GPP TS 38.300 V16.7.0," 3rd Generation Partnership Project; Technical Specification Group Radio Access Network; NR; NR and NG-RAN Overall Description; Stage 2, Release 16, Sep. 2021, 152 pages.

"Extended Long DRX Mode for UE Power Saving," Proceedings of the SA WG2 Meeting #94, ZTE, S2-124879, Previously S2-124730 and S2-124406, Nov. 12, 2012, New Orleans, Louisiana, 2 pages.

"DRX enhancement for NR-U," Proceedings of the 3GPP TSG-RAN WG2 #104, Ericsson, TDoc R2-1817967, Revision of R2-1815027, Nov. 12, 2018, Spokane, Washington, 5 pages.

"Simulations on PDCCH-WUS not applying to the DRX short cycles ," Proceedings of the 3GPP TSG-RAN2# 107bis, Xiaomi Communications, R2-1912910, Oct. 14, 2019, Chongqing, China, 9 pages.

* cited by examiner

Send an indication notification, the indication notification being at least configured to indicate that a DRX parameter or a power saving signal being not applied to at least one first discontinuous reception (DRX) group among two or more DRX groups of user equipment (UE)

S11

Apparatus for processing
discontinuous reception (DRX)

Transceiver unit ⟋ 40

Monitoring
processing unit ⟋ 50

800

804          802

Memory — Processing component — Communication component — 816

806 — Power component

808 — Multimedia component

Processor

820

810 — Audio component

814 — Sensor component

Input/output interface

812

DISCONTINUOUS RECEPTION (DRX) PROCESSING METHOD AND DEVICE, AND COMPUTER STORAGE MEDIUM

CROSS REFERENCE TO RELATED APPLICATION

The present application is a U.S. National Phase of International Application No. PCT/CN2019/124115 entitled "DISCONTINUOUS RECEPTION (DRX) PROCESSING METHOD AND DEVICE, AND COMPUTER STORAGE MEDIUM," and filed on Dec. 9, 2019. The entire contents of the above-listed application is hereby incorporated by reference for all purposes.

BACKGROUND

A power saving signal is introduced in the new generation communication system for saving power. After introduction of a plurality of discontinuous reception (DRX) groups, the power saving signal may fail to be sent due to absence of DRX configurations on a primary cell or primary secondary cell, resulting in high power consumption of user equipment (UE).

SUMMARY

According to a first aspect of the examples of the present disclosure, a method for processing discontinuous reception (DRX) is provided, including:

sending an indication notification, the indication notification being at least configured to indicate that a DRX parameter or a power saving signal being not applied to at least one first DRX group among two or more DRX groups of user equipment (UE).

According to a second aspect of the examples of the present disclosure, a method for processing discontinuous reception (DRX) parameter is provided, including:

receiving an indication notification sent by a base station; and determining, based on the indication notification, that a DRX parameter or a power saving signal being not applied to a first DRX group among two or more DRX groups.

According to a third aspect of the examples of the present disclosure, an apparatus for processing discontinuous reception (DRX) is provided, including:

a processor; and a memory configured to store executable instructions, where the processor is configured to implement, by executing the executable instructions, the method for processing discontinuous reception (DRX) according to any one of above technical solutions applicable to a base station side.

According to a fourth aspect of the examples of the present disclosure, an apparatus for processing discontinuous reception (DRX) is provided, including:

a processor; and a memory configured to store executable instructions, where the processor is configured to implement, by executing the executable instructions, the method for processing discontinuous reception (DRX) according to any one of above technical solutions applicable to a UE side.

According to a fifth aspect of the examples of the present disclosure, a non-transitory computer storage medium is provided. Executable instructions are stored in the non-transitory computer storage medium, and after the executable instructions are executed by a processor, the method for processing discontinuous reception (DRX) according to any one of above technical solutions applicable to a base station side may be implemented.

According to a sixth aspect of the examples of the present disclosure, a non-transitory computer storage medium is provided. Executable instructions are stored in the non-transitory computer storage medium, and after the executable instructions are executed by a processor, the method for processing discontinuous reception (DRX) according to any one of above technical solutions applicable to a UE side may be implemented.

It should be understood that the above general descriptions and later detailed descriptions are merely examples and interpretation and may not limit the present disclosure.

BRIEF DESCRIPTION OF THE DRAWINGS

The accompanying drawings, which are incorporated in and constitute a part of the specification, illustrate examples consistent with the present disclosure and, together with the specification, serve to explain the principles of the present disclosure.

DETAILED DESCRIPTION

Examples will be described in detail herein, instances of which are illustrated in the accompanying drawings. When the following description refers to the accompanying drawings, the same numerals in different accompanying drawings refer to the same or similar elements unless otherwise indicated. The implementations described in the examples below are not intended to represent all implementations consistent with the example of the present application. Rather, they are merely instances of apparatuses and methods consistent with some aspects of the example of the present application, as recited in the appended claims.

The terms used in the examples of the present disclosure are only for the purpose of describing particular examples and are not intended to limit the examples of the present disclosure. As used in the examples of the present disclosure and the appended claims, the singular forms "a", "an", and "the" are intended to include the plural forms as well, unless the context clearly dictates otherwise. It should also be understood that the term "and/or" as used herein refers to including any or all possible combinations of one or more associated listed items.

It should be understood that although the terms "first", "second", "third", etc. may be used in examples of the present disclosure to describe various information, such information should not be limited to these terms. These terms are only used to distinguish the same type of information from each other. For example, without departing from the scope of the examples of the present disclosure, first information may also be referred to as second information, and similarly, the second information may also be referred to as the first information. The words "when" and "if" used herein may be interpreted as "in the case of . . ." or "when . . ." or "in response to determining" depending on the context.

The present disclosure relates to communication technologies, in particular to a method and apparatus for processing discontinuous reception (DRX), and a computer storage medium.

Figures 1, 2:
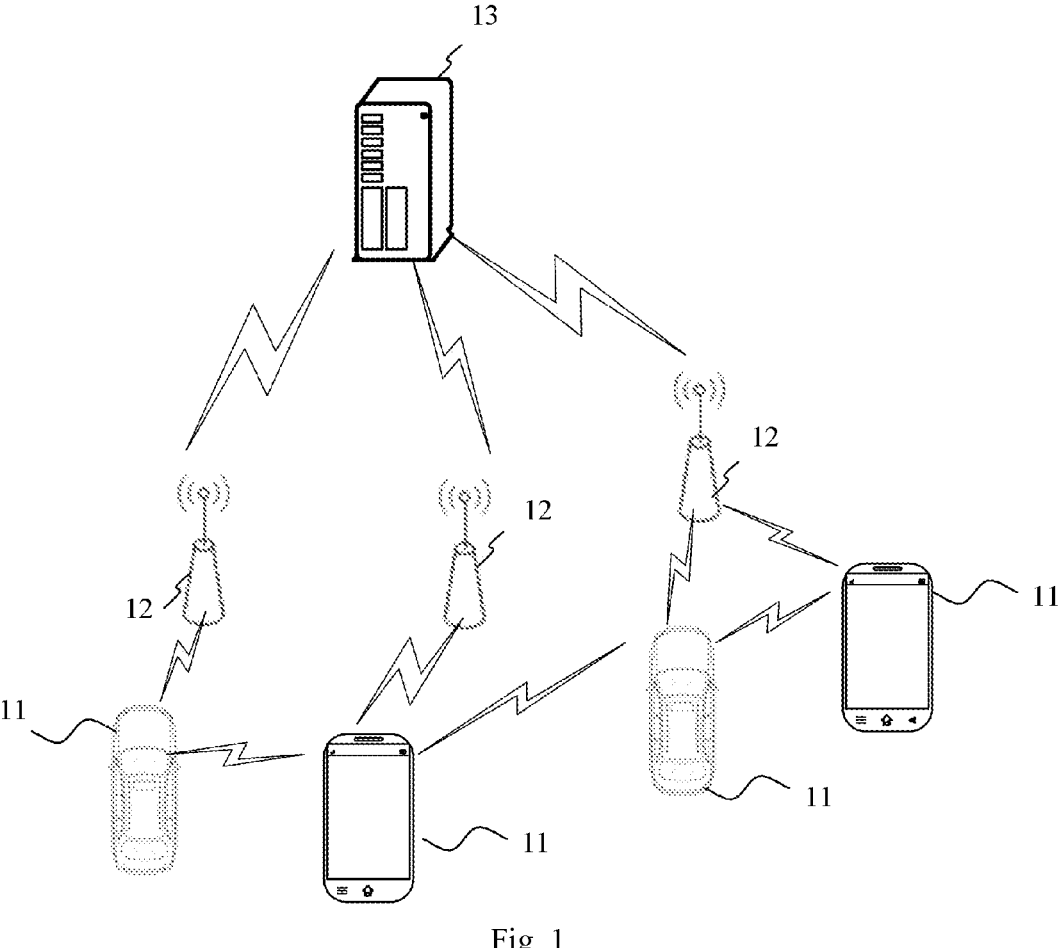
FIG. 1 is a schematic structural diagram of a wireless communication system according to an example.
FIG. 2 is a first flow diagram of a method for processing discontinuous reception (DRX) according to an example.

Referring to FIG. 1, it shows a schematic structural diagram of a wireless communication system provided by an example of the present disclosure. As shown in FIG. 1, the wireless communication system is a communication system based on a cellular mobile communication technology. The wireless communication system may include: a plurality of terminals 11 and a plurality of base stations 12.

The terminals 11 may refer to devices that provide a user with voice and/or data connectivity. The terminals 11 may communicate with one or more core networks via a radio access network (RAN). The terminals 11 may be Internet of Things terminals, such as sensor devices, mobile phones (or referred to as "cellular" phones) and computers with Internet of Things terminals. For example, the terminals may be fixed, portable, pocket-size, handheld, computer built-in or vehicle-mounted apparatuses. For example, the terminals 11 may be stations (STAs), subscriber units, subscriber stations, mobile stations, mobiles, remote stations, access points, remote terminals, access terminals, user terminals, user agents, user devices, or user equipment. Or, the terminals 11 may also be unmanned aircraft devices. Or, the terminals 11 may also be vehicle-mounted devices, such as a trip computer with a wireless communication function, or a wireless communication device connected with an external trip computer. Or, the terminals 11 may also be roadside devices, such as a street lamp, a signal light or other roadside devices with wireless communication functions.

The base stations 12 may be network side devices in the wireless communication system. The wireless communication system may be the 4th generation mobile communication (4G) system which is also referred to as a long term evolution (LTE) system, or the wireless communication system may also be the 5th generation mobile communication (5G) system which is also referred to as a new radio (NR) system or 5G NR system. Or, the wireless communication system may also be a next-generation system of the 5G system. An access network in the 5G system may be referred to as a new generation-radio access network (NG-RAN). Or, the wireless communication system may be a machine-type communication (MTC) system.

The base stations 12 may be evolved base stations (eNB) adopted in the 4G system, or base stations with centralized distributed architecture in the 5G system (gNBs) In general, the base station 12 with the centralized distributed architecture includes a central unit (CU) and at least two distributed units (DUs). Protocol stacks of a packet data convergence protocol (PDCP) layer, a radio link control (RLC) layer and a media access control (MAC) layer are disposed in the central unit. Protocol stacks of physical (PHY) layers are disposed in the distributed units. Specific implementations of the base stations 12 are not limited in the example of the present disclosure.

The base stations 12 and the terminals 11 may establish wireless connection through wireless radio. In different implementations, the wireless radio is a wireless radio based on the 4G standard; or, the wireless radio is a wireless radio based on the 5G standard, such as new radio; or, the wireless radio may also be a wireless radio based on the next-generation mobile communication standard of 5G.

In some examples, the terminals 11 may also establish end to end (E2E) connection, for example, vehicle to vehicle (V2V) communication, vehicle to infrastructure (V2I) communication and vehicle to pedestrian (V2P) communication in vehicle to everything (V2X) communication.

In some examples, the wireless communication system above may further include a network management device 13.

The plurality of base stations 12 are connected with the network management device 13. The network management device 13 may be a core network device in the wireless communication system, for example, the network management device 13 may be a mobility management entity (MME) in an evolved packet core (EPC). Or, the network management device may also be other core network devices, such as a serving gate way (SGW), a public data network gate way (PGW), a policy and charging rules function (PCRF) unit, or a home subscriber server (HSS). The implementation form of the network management device 13 is not limited in the example of the present disclosure.

In order to meet the requirements of improving the peak rate of user equipment (UE) and the system capacity, the characteristics of carrier aggregation (CA) are introduced in Release 10 in the long term evolution (LTE) system. The carrier aggregation may be divided into continuous carrier aggregation and non-continuous carrier aggregation. For continuous carrier aggregation, the UE only needs one transceiver. For different bands of non-continuous carrier aggregation, different radio frequency chains (RF chains) are needed.

In the power saving project of Release 16, a power saving signal is introduced, and is used to notify the UE whether to wake up during the next onDuration period to monitor a physical downlink control channel (PDCCH). In the scenario of carrier aggregation (CA), the power saving signal is only sent in a primary cell or primary secondary cell (Pcell or PSCell), that is, the Pcell/PSCell and a secondary cell (Scell) share a set of power saving signal parameters. The power saving signal may wake up all Pcells and Scells, or the power saving signal may carry an identity document (ID) of a Pcell/PSCell or Scell that needs to be woken up. However, after the introduction of a plurality of DRX groups, it is likely that the power saving signal fails to be sent due to absence of DRX configurations on the Pcell/PSCell.

The present disclosure proposes method examples to save power of the UE based on the above wireless communication system.

FIG. 2 is a first flowchart of a method for processing discontinuous reception (DRX) according to an example. As shown in FIG. 2, the discontinuous reception (DRX) processing method is used in a base station and includes the following steps.

In step S11, an indication notification is sent. The indication notification is at least configured to indicate that a DRX parameter or a power saving signal being not applied
to at least one first DRX group among two or more DRX
groups of user equipment (UE).

In the example, the first DRX group includes:
a DRX group of a primary cell or primary secondary cell
(PCell or PSCell).

Different DRX groups applying DRX parameters may
have different power saving signals.

In some examples, power saving signals for all of the two
or more DRX groups are different; or, power saving signals
for at least two DRX groups of the two or more DRX groups
are different.

In the technical solution of the examples of the present
disclosure, by sending the indication notification configured
to indicate that the DRX parameter being not applied to the
first DRX group among a plurality of DRX groups of the
UE, the UE may determine, based on the indication notifi-
cation, that the DRX parameter or the power saving signal
being not applied to the first DRX group among the plurality
of DRX groups, which is beneficial to reducing power
consumption for monitoring the power saving signal for the
first DRX group.

In the above solution, the two or more DRX groups
further include a second DRX group. The method further
includes:
the power saving signal for the second DRX group is sent
on the first DRX group. The second DRX group is a
DRX group applying the DRX parameter among the
two or more DRX groups.

In this way, by sending the power saving signal for a DRX
group using the power saving signal for a DRX group that
does not use the power saving signal, the problem that the
power saving signal may not be sent due to absence of DRX
configurations on a certain cell such as the primary cell or
primary secondary cell may be solved.

Signal parameters of the power saving signal include:
a cycle of the power saving signal; and
start/end time of the power saving signal.

The cycle is configured according to a DRX cycle con-
figured for the second DRX group.

The start/end time includes start time. The start time is a
time point related to a specified reference point with a preset
offset. The specified reference point is a start point of a
duration configured for the second DRX group.

In some examples, the method further includes:
the power saving signal for the second DRX group is sent
on at least one cell corresponding to the second DRX
group.

In this way, by sending the power saving signal for a DRX
group using the power saving signal on the DRX group
using the power saving signal, the flexibility of parameter
configuration of the power saving signal is improved, and
power consumption for monitoring the power saving signal
may also be reduced.

In some examples, the method further includes:
the power saving signal for the first DRX group being not
sent on a cell corresponding to the first DRX group.

In this way, since the first DRX group does not apply the
DRX parameter, the first DRX group does not use the power
saving signal either, and the power consumption of the UE
for monitoring the power saving signal may be reduced.

In some examples, the method further includes:
first auxiliary information is sent to the base station. The
first auxiliary information is configured to determine
two or more DRX groups.

In this way, the base station may determine, based on the
first auxiliary information, two or more DRX groups.

In some examples, the method further includes:
second auxiliary information is sent to the base station.
The second auxiliary information is configured to
determine the first DRX group to which the DRX
parameter being not applied or a DRX group to which
the power saving signal being not applied.

A DRX group to which the power saving signal being not
applied includes, but is not limited to, the first group.

In this way, the base station may determine, based on the
second auxiliary information, the first DRX group to which
the DRX parameter being not applied or a DRX group to
which the power saving signal being not applied.

In some examples, the indication notification is added to
a first system message or a first dedicated signaling, and the
first system message or the first dedicated signaling is sent
to the UE so that the UE may obtain the indication notifi-
cation from the first system message or the first dedicated
signaling.

In this way, the indication notification may be notified to
the UE via the first system message or the first dedicated
signaling, which improves the reliability of transmission of
configuration information of a power saving signal.

It should be noted that the technical solutions described in
the above examples may be combined arbitrarily without
conflict.

Considering that the first DRX group in the above
examples includes the DRX group of the primary cell or
primary secondary cell (PCell or PSCell), an example of the
present disclosure further provides a method for processing
discontinuous reception (DRX) parameter. The method
includes:
an indication notification is sent. The indication notifica-
tion is at least configured to indicate that a DRX
parameter or a power saving signal being not applied to
at least one first DRX group among two or more DRX
groups of user equipment (UE). The first DRX group
does not include a DRX group of a primary cell or
primary secondary cell (PCell or PSCell).

That is to say, the first DRX group only includes a DRX
group of a secondary cell (SCell).

Different DRX groups applying DRX parameters may
have different power saving signals.

In some examples, power saving signals for all of the two
or more DRX groups are different; or, power saving signals
for at least two DRX groups of the two or more DRX groups
are different.

In the technical solution of the examples of the present
disclosure, by sending the indication notification configured
to indicate that the first DRX group among a plurality of
DRX groups of the UE does not apply the DRX parameter,
the UE may determine, based on the indication notification,
that the first DRX group among the plurality of DRX groups
does not apply the DRX parameter or the power saving
signal, which is beneficial to reducing power consumption
for monitoring the power saving signal on the first DRX
group.

In the above solution, the two or more DRX groups
further include a second DRX group. The method further
includes:
the power saving signal for the second DRX group is sent
by the first DRX group. The second DRX group is a
DRX group applying the DRX parameter among the
two or more DRX groups.

In this way, by sending the power saving signal for a DRX
group using the power saving signal on a DRX group that
does not use the power saving signal, the problem that a
power saving signal may not be sent due to absence of DRX configurations on a certain cell such as the primary cell or primary secondary cell may be solved.

Signal parameters of the power saving signal include:

a cycle of the power saving signal; and start/end time of the power saving signal.

The cycle is configured according to a DRX cycle configured for the second DRX group.

The start/end time includes start time. The start time is a time point related to a specified reference point with a preset offset. The specified reference point is a start point of a duration configured for the second DRX group.

In some examples, the method further includes:

the power saving signal for the second DRX group is sent on at least one cell corresponding to the second DRX group.

In this way, by sending the power saving signal for a DRX group using the power saving signal on the DRX group using the power saving signal, the flexibility of parameter configuration of the power saving signal is improved, and power consumption for monitoring the power saving signal may also be reduced.

In some examples, the method further includes:

the power saving signal for the first DRX group is not sent on a cell corresponding to the first DRX group.

In this way, since the first DRX group does not apply the DRX parameter, the first DRX group does not use the power saving signal either, and the power consumption of the UE for monitoring the power saving signal may be reduced.

In some examples, the method further includes:

first auxiliary information is sent to the base station. The first auxiliary information is configured to determine two or more DRX groups.

In this way, the base station may determine, based on the first auxiliary information, two or more DRX groups.

In some examples, the method further includes:

second auxiliary information is sent to the base station. The second auxiliary information is configured to determine the first DRX group to which the DRX parameter being not applied or a DRX group to which the power saving signal being not applied.

In this way, the base station may determine, based on the second auxiliary information, the first DRX group to which the DRX parameter being not applied or a DRX group to which the power saving signal being not applied.

In some examples, the indication notification is added to a first system message or a first dedicated signaling, and the first system message or the first dedicated signaling is sent to the UE so that the UE may obtain the indication notification from the first system message or the first dedicated signaling.

In this way, the indication notification may be notified to the UE via the first system message or the first dedicated signaling, which improves the reliability of transmission of configuration information of a power saving signal.

Figure 3:
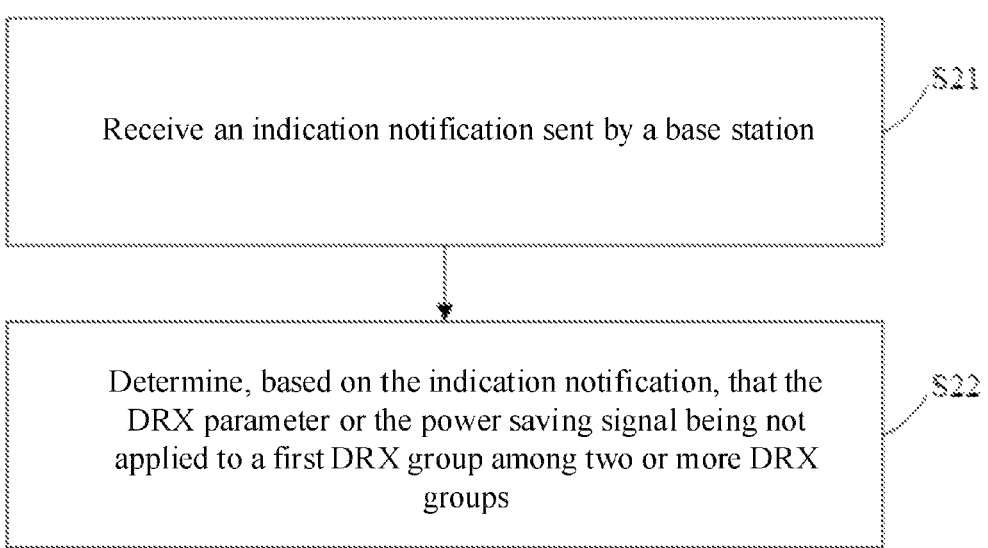
FIG. 3 is a second flow diagram of a method for processing discontinuous reception (DRX) according to an example.

FIG. 3 is a second flowchart of a method for processing discontinuous reception (DRX) according to an example. As shown in FIG. 3, the discontinuous reception (DRX) processing method is used in UE, and includes the following steps.

In step S21, an indication notification sent by a base station is received.

In step S22, it is determined, based on the indication notification, that a DRX parameter or a power saving signal being not applied to a first DRX group among two or more DRX groups.

In some implementations, the first DRX group includes:

a DRX group corresponding to a primary cell or primary secondary cell (PCell or PSCell).

In some implementations, the first DRX group includes:

a DRX group corresponding to a secondary cell (SCell).

Different DRX groups applying DRX parameters may have different power saving signals.

In some examples, power saving signals for all of the two or more DRX groups are different; or, power saving signals of at least two DRX groups of the two or more DRX groups are different.

In this way, the first DRX group to which the DRX parameter being not applied among a plurality of DRX groups may be determined based on the indication notification sent by the base station, which is beneficial to reducing power consumption for monitoring the power saving signal on the first DRX group.

In the above solution, the two or more DRX groups further include a second DRX group. The method further includes:

the power saving signal for the second DRX group is monitored on the first DRX group. The second DRX group is a DRX group applying the DRX parameter among the two or more DRX groups.

In this way, by monitoring the power saving signal for the second DRX group on the first DRX group, the power consumption of the UE for monitoring the power saving signal may be reduced.

In some examples, signal parameters of the power saving signal include:

a cycle of the power saving signal; and start/end time of the power saving signal.

The cycle is configured according to a DRX cycle configured for the second DRX group.

The start/end time includes start time. The start time is a time point related to a specified reference point with a preset offset. The specified reference point is a start point of a duration configured for the second DRX group.

In some examples, the method further includes:

the power saving signal for the second DRX group is monitored on at least one cell corresponding to the second DRX group.

In this way, by sending the power saving signal for a DRX group using the power saving signal on the DRX group using the power saving signal, the flexibility of monitoring of the power saving signal is improved, and power consumption for monitoring the power saving signal may also be reduced.

In some examples, the method further includes: the power saving signal for the first DRX group is not monitored on a cell corresponding to the first DRX group.

In this way, power consumption for monitoring the power saving signal on the first DRX group may be reduced.

In some examples, the method further includes:

first auxiliary information is sent to the base station. The first auxiliary information is configured to determine two or more DRX groups.

In this way, the base station may determine, based on the first auxiliary information, two or more DRX groups.

In some examples, the method further includes:

second auxiliary information is sent to the base station. The second auxiliary information is configured to determine the first DRX group to which the DRX parameter being not applied or a DRX group to which the power saving signal being not applied.

In this way, the base station may determine, based on the second auxiliary information, the first DRX group to which the DRX parameter or the power saving signal being not applied.

Figure 4:
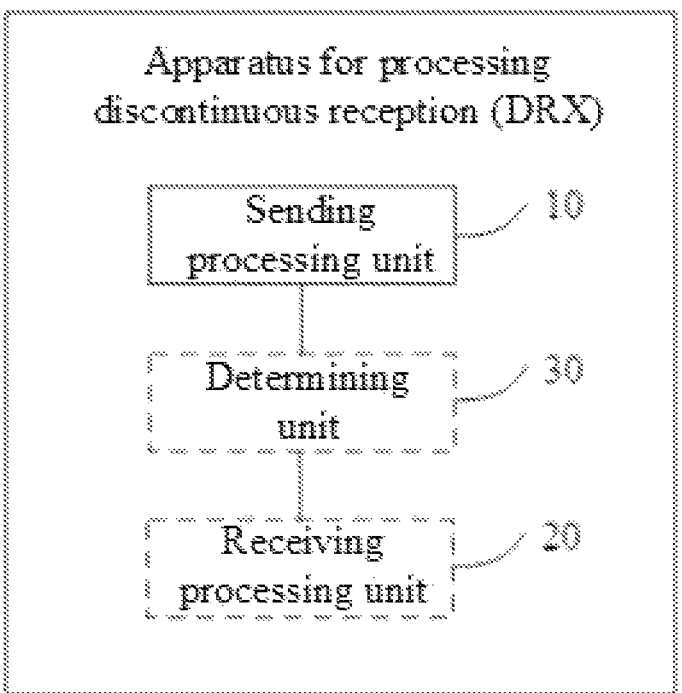
FIG. 4 is a first block diagram of an apparatus for processing discontinuous reception (DRX) according to an example.

FIG. 4 is a first block diagram of an apparatus for processing discontinuous reception (DRX) according to an example. The apparatus for processing discontinuous reception (DRX) is applied to a base station side. Referring to FIG. 4, the apparatus includes a sending processing unit 10.

The sending processing unit 10 is configured to send an indication notification. The indication notification is at least configured to indicate that a DRX parameter or a power saving signal being not applied to at least one first DRX group among two or more DRX groups of UE.

In some implementations, the first DRX group includes: a DRX group corresponding to a primary cell or primary secondary cell (PCell or PSCell).

In some implementations, the first DRX group includes: a DRX group corresponding to a secondary cell (SCell).

In some implementations, the sending processing unit 10 is configured to:

the power saving signal for the first DRX group being not sent on a cell corresponding to the first DRX group.

In some implementations, the two or more DRX groups further include a second DRX group. The sending processing unit 10 is configured to:

send the power saving signal for the second DRX group by the first DRX group. The second DRX group is a DRX group applying the DRX parameter among the two or more DRX groups.

In some implementations, signal parameters of the power saving signal for the second DRX group at least include the following parameters:

a cycle of the power saving signal; and
start/end time of the power saving signal.

The cycle is configured according to a DRX cycle configured for the second DRX.

The start/end time includes start time. The start time is a time point related to a specified reference point with a preset offset. The specified reference point is a start point of a duration configured for the second DRX group.

In some implementations, the two or more DRX groups further include a second DRX group. The sending processing unit 10 is configured to:

the power saving signal for the second DRX group is sent on at least one cell corresponding to the second DRX group. The second DRX group is a DRX applying the DRX parameter among the two or more DRX groups.

In the above solution, power saving signals for all of the two or more DRX groups are different; or, power saving signals for at least two DRX groups of the two or more DRX groups are different.

In some implementations, the apparatus further includes:

a receiving processing unit 20, configured to receive first auxiliary information sent by the UE; and a determining unit 30, configured to determine, based on the first auxiliary information, two or more DRX groups.

The receiving processing unit 20 is further configured to receive second auxiliary information sent by the UE.

The determining unit 30 is further configured to determine, based on the second auxiliary information, the first DRX group to which the DRX parameter being not applied or a DRX group to which the power saving signal being not applied among the two or more DRX groups.

As for the apparatus in the above examples, the specific manner in which each module performs operations has been described in detail in the examples of the method, and detailed description will not be given here.

In practical applications, the specific structures of the above sending processing unit 10, receiving processing unit 20 and determining unit 30 may be implemented by the apparatus for processing discontinuous reception (DRX) or a central processing unit (CPU), a micro controller unit (MCU), a digital signal processor (DSP), a programmable logic controller (PLC), etc. in a base station to which the apparatus for processing discontinuous reception (DRX) belongs.

The apparatus for processing discontinuous reception (DRX) of the example may be disposed on the base station side.

Those skilled in the art should understand that the functions of each processing module in the apparatus for processing discontinuous reception (DRX) of the example of the present disclosure can be understood by referring to the above description of the method for processing discontinuous reception (DRX) applied to the base station side. Each processing module in the apparatus for processing discontinuous reception (DRX) of the example of the present disclosure can be implemented by an analog circuit that implements the functions of the examples of the present disclosure, or can be implemented by software executing the functions of the examples of the present disclosure on a terminal.

In the apparatus for processing discontinuous reception (DRX) of the example of the present disclosure, by sending the indication notification configured to indicate that the first DRX group among a plurality of DRX groups of the UE does not apply the DRX parameter, the UE may determine, based on the indication notification, that the first DRX group among the plurality of DRX groups does not apply the DRX parameter, which is beneficial to reducing power consumption for monitoring the power saving signal on the first DRX group.

Figures 5, 6:
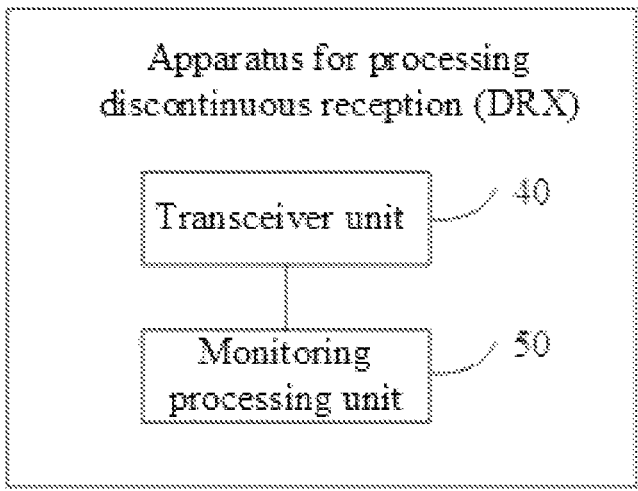
FIG. 5 is a second block diagram of an apparatus for processing discontinuous reception (DRX) according to an example.
FIG. 6 is a first block diagram of a processing apparatus 800 for discontinuous reception (DRX) according to an example.

FIG. 5 is a second block diagram of an apparatus for processing discontinuous reception (DRX) according to an example. The apparatus for processing discontinuous reception (DRX) is applied to a UE side. Referring to FIG. 5, the apparatus includes a transceiver unit 40 and a monitoring processing unit 50.

The transceiver unit 40 is configured to receive an indication notification sent by a base station.

The monitoring processing unit 50 is configured to determine, based on the indication notification, that a DRX parameter or a power saving signal being not applied to a first DRX group among two or more DRX groups.

In some implementations, the first DRX group includes: a DRX group corresponding to a primary cell or primary secondary cell (PCell or PSCell).

In some implementations, the first DRX group includes: a DRX group corresponding to a secondary cell (SCell).

In some implementations, the monitoring processing unit 50 is further configured to:

the power saving signal for the first DRX group being not monitor on a cell corresponding to the first DRX group.

In some implementations, the two or more DRX groups further include a second DRX group. The monitoring processing unit 50 is further configured to:

monitor the power saving signal for the second DRX group on the first DRX group. The second DRX group is a DRX group applying the DRX parameter among the two or more DRX groups.

In some implementations, signal parameters of the power saving signal for the second DRX group at least include the following parameters:

a cycle of the power saving signal; and start/end time of the power saving signal.

The cycle is configured according to a DRX cycle configured for the second DRX.

The start/end time includes start time. The start time is a time point related to a specified reference point with a preset offset. The specified reference point is a start point of a duration configured for the second DRX group.

In some implementations, the two or more DRX groups further include a second DRX group. The monitoring processing unit 50 is further configured to:

monitor the power saving signal for the second DRX group on at least one cell corresponding to the second DRX group. In the above solution, power saving signals for all of the two or more DRX groups are different; or, power saving signals for at least two DRX groups of the two or more DRX groups are different.

In some implementations, the transceiver unit 40 is further configured to:

send first auxiliary information to the base station, the first auxiliary information being configured to determine two or more DRX groups;

and/or send second auxiliary information to the base station, the second auxiliary information being configured to determine the first DRX group to which the DRX parameter being not applied or a DRX group to which the power saving signal being not applied.

As for the apparatus in the above examples, the specific manner in which each module performs operations has been described in detail in the examples of the method, and detailed description will not be given here.

In practical applications, the specific structures of the above transceiver unit 40 and monitoring processing unit 50 can be implemented by the apparatus for processing discontinuous reception (DRX) or a CPU, MCU, DSP or PLC in UE to which the apparatus for processing discontinuous reception (DRX) belongs.

The apparatus for processing discontinuous reception (DRX) of the example may be disposed on the UE side.

Those skilled in the art should understand that the functions of each processing module in the apparatus for processing discontinuous reception (DRX) of the example of the present disclosure can be understood by referring to the above description of the method for processing discontinuous reception (DRX) applied to the UE side. Each processing module in the apparatus for processing discontinuous reception (DRX) of the example of the present disclosure can be implemented by an analog circuit that implements the functions of the examples of the present disclosure, or can be implemented by software executing the functions of the examples of the present disclosure on a terminal.

In the apparatus for processing discontinuous reception (DRX) of the example of the present disclosure, the first DRX group to which the DRX parameter being not applied among a plurality of DRX groups may be determined based on the indication notification sent by the base station, which is beneficial to reducing power consumption for monitoring the power saving signal on the first DRX group.

FIG. 6 is a block diagram of an apparatus 800 for discontinuous reception (DRX) processing according to an example. For example, the apparatus 800 may be a mobile phone, a computer, a digital broadcasting terminal, a messaging device, a game console, a tablet device, a medical device, a fitness device, a personal digital assistant, etc.

Referring to FIG. 6, the apparatus 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls the overall operation of the apparatus 800, such as operations associated with display, telephone call, data communication, camera operations, and recording operations. The processing component 802 may include one or more processors 820 to execute instructions to complete all or part of the steps of the above method. In addition, the processing component 802 may include one or more modules to facilitate interaction between the processing component 802 and other components. For example, the processing component 802 may include a multimedia module to facilitate interaction between the multimedia component 808 and the processing component 802.

The memory 804 is configured to store various types of data to support operations at the apparatus 800. Instances of these data include instructions for any application or method operating on the apparatus 800, contact data, phonebook data, messages, pictures, videos, etc. The memory 804 may be implemented by any type of volatile or non-volatile storage devices or their combination, such as a static random access memory (SRAM), an electrically-erasable programmable read only memory (EEPROM), an erasable programmable read only memory (EPROM), a programmable read-only memory (PROM), a read only memory (ROM), a magnetic memory, a flash memory, a magnetic disk or a compact disc.

The power component 806 provides power for various components of the apparatus 800. The power component 806 may include a power management system, one or more power sources, and other components associated with generating, managing and distributing power for the apparatus 800.

The multimedia component 808 includes a screen providing an output interface between the apparatus 800 and a user. In some examples, the screen may include a liquid crystal display (LCD) and a touch panel (TP). If the screen includes the touch panel, the screen may be implemented as a touch screen to receive an input signal from the user. The touch panel includes one or more touch sensors to sense touch, swiping and gestures on the touch panel. The touch sensor can not only sense the boundary of the touch or swiping operation, but also detect the duration and pressure related to the touch or swiping operation. In some examples, the multimedia component 808 includes a front camera and/or a rear camera. When the apparatus 800 is in an operation mode, such as a shooting mode or a video mode, the front camera and/or the rear camera can receive external multimedia data. Each of the front camera and the rear camera may be a fixed optical lens system or has a focal length and optical zoom capability.

The audio component 810 is configured to output and/or input audio signals. For example, the audio component 810 includes a microphone (MIC), and when the apparatus 800 is in an operation mode, such as a call mode, a recording mode, or a voice recognition mode, the microphone is configured to receive external audio signals. The received audio signal may be further stored in the memory 804 or transmitted via the communication component 816. In some examples, the audio component 810 also includes a speaker for outputting an audio signal.

The I/O interface 812 provides an interface between the processing component 802 and a peripheral interface module which may be a keyboard, a click wheel, a button, etc. These buttons may include but are not limited to: a home button, volume buttons, a start button and a lock button.

The sensor component 814 includes one or more sensors for providing state evaluation of various aspects of the apparatus 800. For example, the sensor component 814 may detect an on/off state of the apparatus 800 and the relative positioning of the components, for example, the component is a display and a keypad of the apparatus 800. The sensor component 814 may also detect the change of the position of the apparatus 800 or one component of the apparatus 800, the presence or absence of user contact with the apparatus 800, the azimuth or acceleration/deceleration of the apparatus 800, and temperature change of the apparatus 800. The sensor component 814 may include a proximity sensor configured to detect the presence of nearby objects without any physical contact. The sensor component 814 may also include an optical sensor, such as a complementary metal oxide semiconductor (CMOS) or a charge-coupled device (CCD) image sensor, for use in imaging applications. In some examples, the sensor component 814 may further include an acceleration sensor, a gyroscope sensor, a magnetic sensor, a pressure sensor, or a temperature sensor.

The communication component 816 is configured to facilitate wired or wireless communication between the apparatus 800 and other devices. The apparatus 800 may access a wireless network based on a communication standard, such as Wi-Fi, 2G or 3G, or their combination. In an example, the communication component 816 receives a broadcast signal or broadcast-related information from an external broadcast management system via a broadcast channel. In an example, the communication component 816 further includes a near field communication (NFC) module to facilitate short-range communications. For example, the NFC module may be implemented based on the radio frequency identification (RFID) technology, infrared data association (IrDA) technology, ultra wide band (UWB) technology, Bluetooth (BT) technology. etc.

In an example, the apparatus 800 may be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors, or other electronic components to execute the above method for processing discontinuous reception (DRX) applied to a user terminal side.

In an example, a non-transitory computer storage medium including executable instructions is further provided, such as a memory 804 including executable instructions. The above executable instructions may be executed by a processor 820 of the apparatus 800 to perform the above method. For example, the non-transitory computer storage medium may be a ROM, a random access memory (RAM), a CD-ROM, a magnetic tape, a floppy disk, an optical data storage device, etc.

Figure 7:
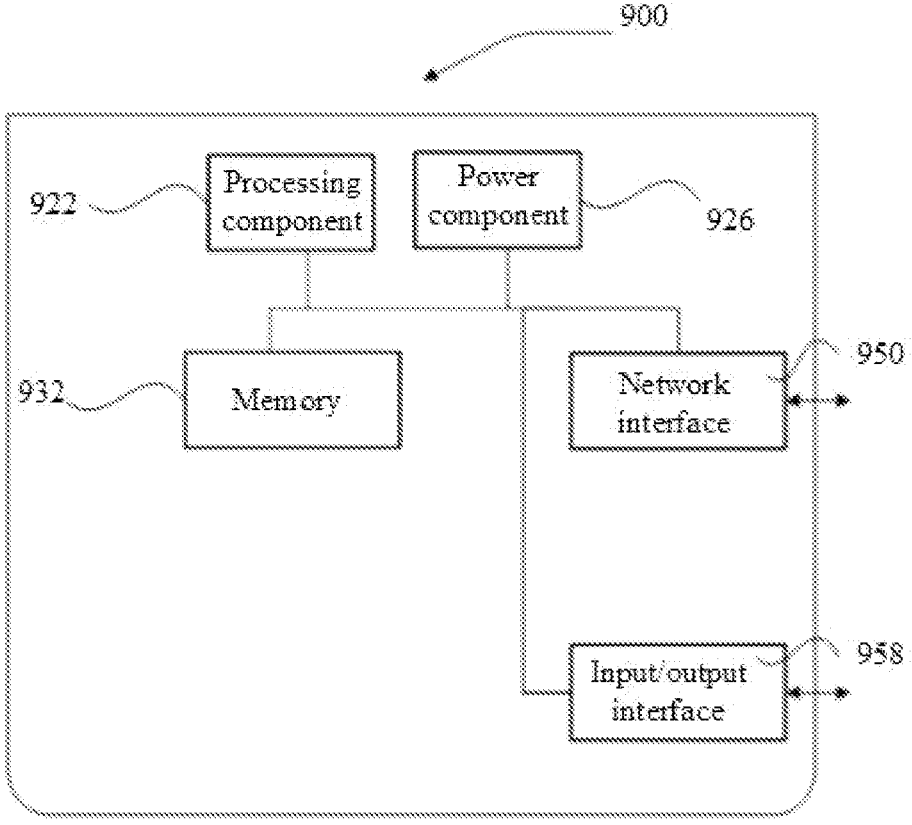
FIG. 7 is a second block diagram of a processing apparatus 900 for discontinuous reception (DRX) according to an example.

FIG. 7 is a block diagram of an apparatus 900 for discontinuous reception (DRX) processing according to an example. For example, the apparatus 900 may be provided as a server. Referring to FIG. 7, the apparatus 900 includes a processing component 922 which further includes one or more processors, and memory resources represented by a memory 932 and configured to store instructions executable by the processing component 922, such as applications. The applications stored in the memory 932 may include one or more modules, each of which corresponds to a set of instructions. In addition, the processing component 922 is configured to execute instructions to execute the above method for processing discontinuous reception (DRX) applied to the base station side.

The apparatus 900 may further include a power component 926 configured to execute power management of the apparatus 900, a wired or wireless network interface 950 configured to connect the apparatus 900 to a network, and an input/output (I/O) interface 958. The apparatus 900 may be operated based on an operating system stored in the memory 932, such as Windows Server™, Mac OS X™, Unix™, Linux™, FreeBSD™ or the like.

The technical solutions recorded in the examples of the present disclosure may be combined arbitrarily without conflict.

Other examples of the present disclosure will be apparent to those skilled in the art from consideration of the specification and practice of the disclosure herein. The present application is intended to cover any variations, uses, or adaptations of the present disclosure following the general principles of the present disclosure and including such departures from the present disclosure as come within known or customary practice in the art. It is intended that the specification and examples be considered as examples only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope of the present disclosure. It is intended that the scope of the present disclosure only be limited by the appended claims.

According to an aspect of the examples of the present disclosure, a method for processing discontinuous reception (DRX) is provided, including:

sending an indication notification, the indication notification being at least configured to indicate that a DRX parameter or a power saving signal being not applied to at least one first DRX group among two or more DRX groups of user equipment (UE).

In the above solution, the method includes:

the power saving signal for the first DRX group being not sent on a cell corresponding to the first DRX group.

In the above solution, the two or more DRX groups further include a second DRX group; and the method further includes:

sending the power saving signal for the second DRX group by the first DRX group, the second DRX group being a DRX group applying the DRX parameter among the two or more DRX groups.

In the above solution, signal parameters of the power saving signal for the second DRX group at least include the following parameters:

a cycle of the power saving signal; and start/end time of the power saving signal.

In the above solution, the cycle is configured according to a DRX cycle configured for the second DRX group; and the start/end time includes start time, wherein the start time is a time point related to a specified reference point with a preset offset, and the specified reference point is a start point of a duration configured for the second DRX group.

In the above solution, the two or more DRX groups further include a second DRX group; and the method further includes:

sending the power saving signal for the second DRX group on at least one cell corresponding to the second DRX group, the second DRX group being a DRX applying the DRX parameter among the two or more DRX groups.

In the above solution, the method further includes:

receiving first auxiliary information sent by the UE; and determining, based on the first auxiliary information, the two or more DRX groups;

and/or receiving second auxiliary information sent by the UE; and determining, based on the second auxiliary information, the first DRX group to which the DRX parameter being not applied or a DRX group to which the power saving signal being not applied among the two or more DRX groups.

According to an aspect of the examples of the present disclosure, a method for processing discontinuous reception (DRX) parameter is provided, including:

receiving an indication notification sent by a base station; and determining, based on the indication notification, that a DRX parameter or a power saving signal being not applied to a first DRX group among two or more DRX groups.

In the above solution, the method further includes:

the power saving signal for the first DRX group being not monitor on a cell corresponding to the first DRX group.

In the above solution, the two or more DRX groups further include a second DRX group; and the method further includes:

monitoring the power saving signal for the second DRX group on the first DRX group, the second DRX group being a DRX group applying the DRX parameter among the two or more DRX groups.

In the above solution, signal parameters for the power saving signal for the second DRX group at least include the following parameters:

a cycle of the power saving signal; and start/end time of the power saving signal.

In the above solution, the cycle is configured according to a DRX cycle configured for the second DRX group; and the start/end time includes start time, wherein the start time is a time point related to a specified reference point with a preset offset, and the specified reference point is a start point of a duration configured for the second DRX group.

In the above solution, the two or more DRX groups further include a second DRX group; and the method further includes:

monitoring the power saving signal for the second DRX group on at least one cell corresponding to the second DRX group.

In the above solution, the method further includes:

sending first auxiliary information to the base station, the first auxiliary information being configured to determine the two or more DRX groups;

and/or sending second auxiliary information to the base station, the second auxiliary information being configured for determining the first DRX group to which the DRX parameter being not applied or a DRX group to which the power saving signal being not applied.

According to an aspect of the examples of the present disclosure, an apparatus for processing discontinuous reception (DRX) is provided, including:

a sending processing unit, configured to send an indication notification, the indication notification being at least configured to indicate that a DRX parameter or a power saving signal being not applied to at least one first DRX group among two or more DRX groups of user equipment (UE).

According to an aspect of the examples of the present disclosure, an apparatus for processing discontinuous reception (DRX) is provided, including:

a transceiver unit, configured to receive an indication notification sent by a base station; and a monitoring processing unit, configured to determine, based on the indication notification, that a DRX parameter or a power saving signal being not applied to a first DRX group among two or more DRX groups.

The technical solution provided by the examples of the present disclosure may include the following beneficial effects:

The indication notification is sent, the indication notification being at least configured to indicate that a DRX parameter or a power saving signal being not applied to at least one first DRX group among two or more DRX groups of the user equipment (UE). In this way, the UE may determine, based on the indication notification, that the first DRX group among a plurality of DRX groups does not apply the DRX parameter, which is beneficial to reducing power consumption for monitoring the power saving signal on the first DRX group.

It should be understood that the above general descriptions and later detailed descriptions are merely examples and interpretation and may not limit the present disclosure.

The invention claimed is:

1. A method for processing discontinuous reception (DRX), comprising:

sending an indication notification, the indication notification being at least configured to indicate that a DRX parameter being not applied to at least one first DRX group among two or more DRX groups of user equipment (UE);

wherein the two or more DRX groups further comprise a second DRX group; and the method further comprises:

sending a power saving signal for the second DRX group by the at least one first DRX group, the second DRX group being a DRX group applying the DRX parameter among the two or more DRX groups;

wherein the method further comprises:

receiving second auxiliary information sent by the UE; and determining, based on the second auxiliary information, the at least one first DRX group to which the DRX parameter being not applied among the two or more DRX groups;

wherein the first DRX group includes a DRX group corresponding to a primary cell or a primary secondary cell, or the first DRX group includes a DRX group corresponding to a secondary cell.

2. The method according to claim 1, comprising:

the power saving signal for the at least one first DRX group being not sent on a cell corresponding to the at least one first DRX group.

3. The method according to claim 1, wherein signal parameters of the power saving signal for the second DRX group comprise at least one of the following parameters:

a cycle of the power saving signal; or a start/end time of the power saving signal.

4. The method according to claim 3, wherein the cycle is configured according to a DRX cycle configured for the second DRX group; and the start/end time comprises a start time, wherein the start time is a time point related to a specified reference point with a preset offset, and the specified reference point is a start point of a duration configured for the second DRX group.

5. The method according to claim 1, wherein the method further comprises:

sending the power saving signal for the second DRX group on at least one cell corresponding to the second DRX group.

6. The method according to claim 1, further comprising:

receiving first auxiliary information sent by the UE; and determining, based on the first auxiliary information, the two or more DRX groups.

7. A method for processing discontinuous reception (DRX) parameter, comprising:

receiving an indication notification sent by a base station; and determining, based on the indication notification, that a DRX parameter being not applied to a first DRX group among two or more DRX groups;

wherein the two or more DRX groups further comprise a second DRX group; and the method further comprises:

monitoring a power saving signal for the second DRX group on the first DRX group, the second DRX group being a DRX group applying the DRX parameter among the two or more DRX groups;

wherein the method further comprises:

sending second auxiliary information to the base station, the second auxiliary information being configured for determining the first DRX group to which the DRX parameter being not applied;

wherein the first DRX group includes a DRX group corresponding to a primary cell or a primary secondary cell, or the first DRX group includes a DRX group corresponding to a secondary cell.

8. The method according to claim 7, further comprising:

the power saving signal for the first DRX group being not monitor on a cell corresponding to the first DRX group.

9. The method according to claim 7, wherein signal parameters for the power saving signal for the second DRX group comprise at least one of the following parameters:

a cycle of the power saving signal; or a start/end time of the power saving signal.

10. The method according to claim 9, wherein the cycle is configured according to a DRX cycle configured for the second DRX group; and the start/end time comprises a start time, wherein the start time is a time point related to a specified reference point with a preset offset, and the specified reference point is a start point of a duration configured for the second DRX group.

11. The method according to claim 7, wherein the method further comprises:

monitoring the power saving signal for the second DRX group on at least one cell corresponding to the second DRX group.

12. The method according to claim 7, further comprising:

sending first auxiliary information to the base station, the first auxiliary information being configured to determine the two or more DRX groups.

13. An apparatus for processing discontinuous reception (DRX), comprising:

one or more processors; and a memory configured to store executable instructions, wherein, the one or more processors, when collectively executing the executable instructions, are collectively configured to: implement the method for processing discontinuous reception (DRX) according to claim 1.

14. An apparatus for processing discontinuous reception (DRX), comprising:

one or more processors; and a memory configured to store executable instructions, wherein, the one or more processors, when collectively executing the executable instructions, are collectively configured to:

receive an indication notification sent by a base station; and determine, based on the indication notification, that a DRX parameter being not applied to a first DRX group among two or more DRX groups;

wherein the two or more DRX groups further comprise a second DRX group; and the one or more processors are further collectively configured to:

monitor a power saving signal for the second DRX group on the first DRX group, the second DRX group being a DRX group applying the DRX parameter among the two or more DRX groups;

wherein the one or more processors are further collectively configured to:

send second auxiliary information to the base station, the second auxiliary information being configured for determining the first DRX group to which the DRX parameter being not applied;

wherein the first DRX group includes a DRX group corresponding to a primary cell or a primary secondary cell, or the first DRX group includes a DRX group corresponding to a secondary cell.

15. A non-transitory computer storage medium, wherein executable instructions are stored in the non-transitory computer storage medium, and when the executable instructions are executed by one or more processors, cause the one or more processors to perform the method for processing discontinuous reception (DRX) according to claim 1.

16. A non-transitory computer storage medium, wherein executable instructions are stored in the non-transitory computer storage medium, and when the executable instructions are executed by one or more processors, cause the one or more processors to perform the method for processing discontinuous reception (DRX) according to claim 7.

\* \* \* \* \*